Oct. 13, 1970     D. P. GELLERT     3,533,202
MODULAR SHELTER OR BUILDING
Filed Dec. 13, 1968     2 Sheets-Sheet 1
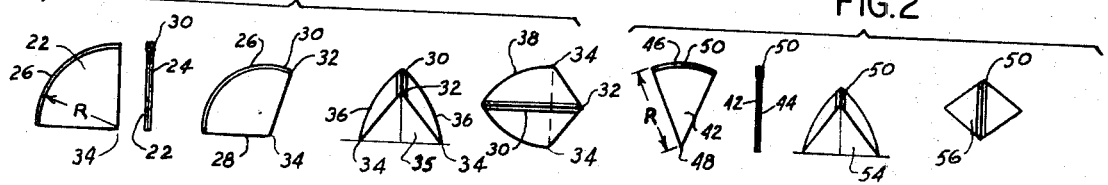
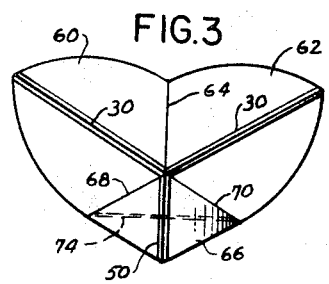
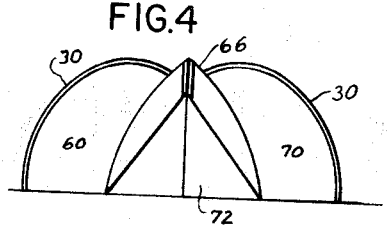
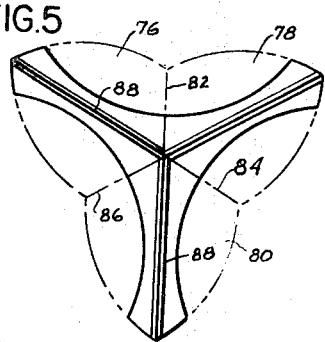
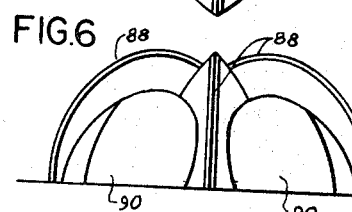
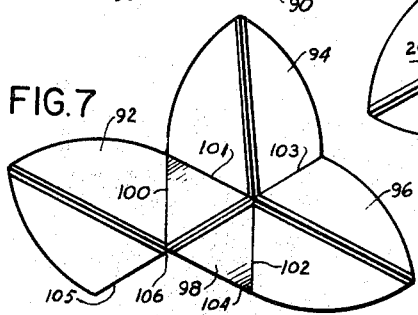
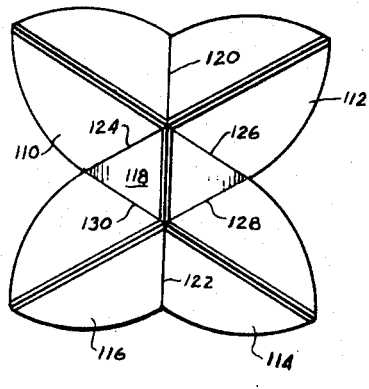
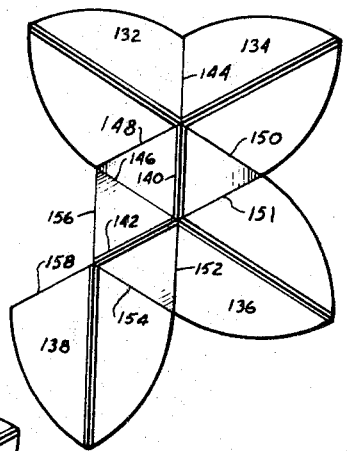
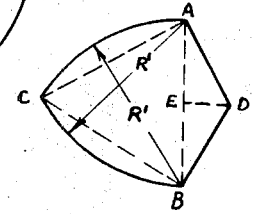
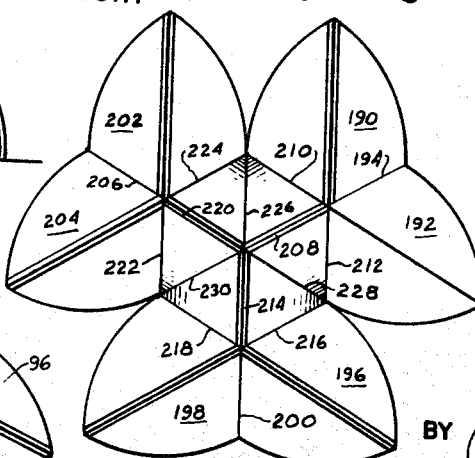
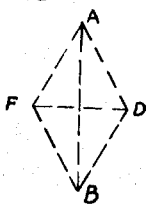
INVENTOR.
DONALD P. GELLERT
BY *James and Franklin*
ATTORNEYS Oct. 13, 1970    D. P. GELLERT    3,533,202
MODULAR SHELTER OR BUILDING
Filed Dec. 13, 1968    2 Sheets-Sheet 2
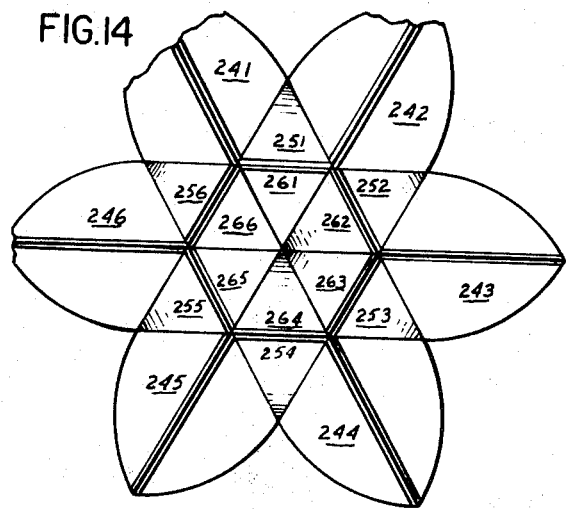
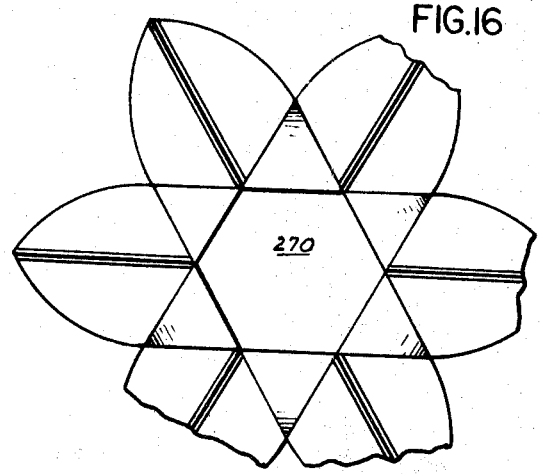
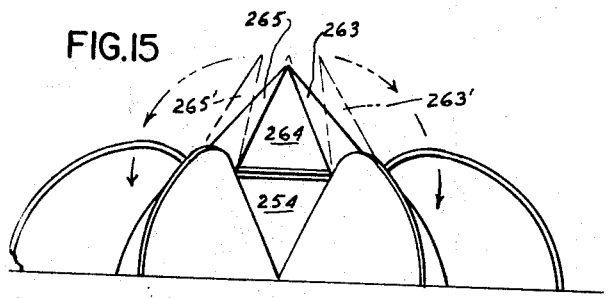
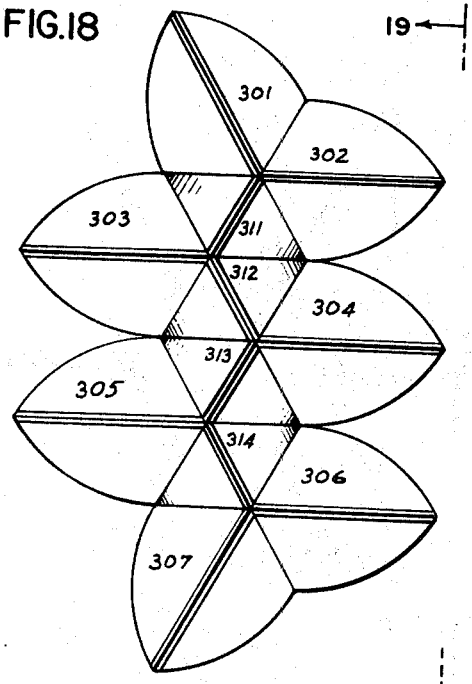
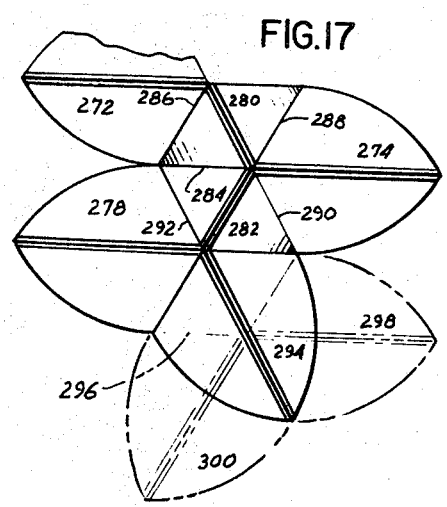
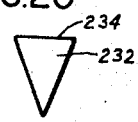
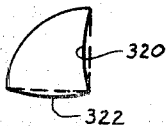
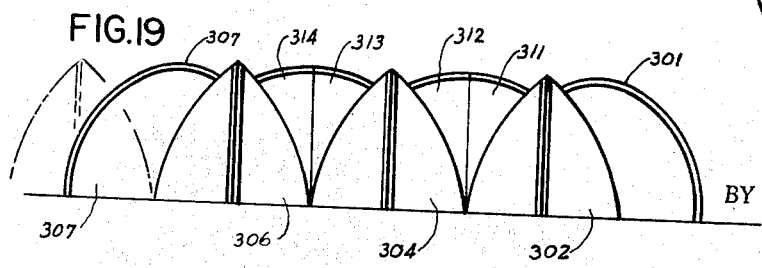
INVENTOR.
DONALD P. GELLERT
BY James and Franklin
ATTORNEYS

United States Patent Office 3,533,202
Patented Oct. 13, 1970

3,533,202
MODULAR SHELTER OR BUILDING
Donald P. Gellert, St. Thomas, Virgin Islands, assignor to Sunbird Industries, Inc., Charlotte Amalie, St. Thomas, Virgin Islands, a corporation of the Virgin Islands
Filed Dec. 13, 1968, Ser. No. 783,668
Int. Cl. E04B 1/32
U.S. Cl. 52—80    20 Claims

ABSTRACT OF THE DISCLOSURE

The shelter or building is modular, and many modules may be combined to make a structure as large as needed. The individual modules may be prefabricated, shipped in compact condition, and easily erected. The modules have paired side walls which are sector-shaped, and there are both wide and narrow modules. The wide modules are positioned with one pair of radial edges spread apart and secured to ground or base, while the other radial edges are generally upright. The narrow modules are disposed with their acute angle downward. The upright edges of the modules are joined to form a continuous shelter. In a preferred example the side walls of the modules are 90° sectors and 45° sectors having the same radius. In most cases the narrow modules act as a filler between angularly related wide modules.

---

In a companion patent application, Ser. No. 783,669, filed concurrently herewith, I describe a shelter or building using two like walls which are semi-rigid or somewhat flexible. Matching parts of their periphery are curved and joined by means having a hinge action which affords flexing and spreading apart of the walls, except at the joined parts which are exposed generally upward, somewhat like a roof ridge. Portions of the free edges are secured in spread relation on the ground, or on a suitable base such as a concrete slab. Such a shelter has the advantages that it may be prefabricated, shipped in compact condition, and easily erected, but it is limited in size and in attractiveness of appearance.

The present improvement retains the advantages without the limitations. The present shelter or building is modular, and few or many modules may be combined to make a structure as large as needed. Indeed, modules may be added to an existing modular structure to expand the area enclosed thereby. The resulting structures may be made attractive in appearance and may be designed in a great variety of layouts, and yet the individual modules may be prefabricated and shipped in compact condition, and may be easily erected at the selected site.

The paired side walls of the modules are generally sector-shaped, and there are both wide and narrow modules. The wide modules are positioned with one pair of radial edges secured to ground or base, while the other pair of radial edges is generally upright, whereas the narrow modules are disposed with their acute angle downward. At least some of the upright edges of the modules are joined edge to edge to form a continuous shelter. In a specific and preferred example the side walls of the wide modules are approximately a quadrant or 90° sector, while the side walls of the narrow modules have an angle about half that, the angle being approximately 45°. Both the wide and narrow sectors preferably have the same radius.

The side walls of the wide modules are spread apart at the bottom of the open end a distance nearly equalling the radius of the sector wall. This spread causes the ridge peak to overhang an imaginary line connecting the lower corner, and this overhang is made an amount approximately equal to half the spread multiplied by the tangent of 30°. The wide module is preferably so shaped that it covers a base area defined by two intersecting curves having the same radius as the spread, and by two sloping lines intersecting at a point beneath the ridge peak projecting as just defined.

In contrast the narrow module covers a diamond shaped base area having four equal sides, which also equal the short axis of the diamond, and which therefore is made up of two equilateral triangles back to back, so that the interior angles are 60° and 120°. The sides and the short axis of the diamond are equal to half the spread multiplied by the tangent of 30°.

As will be seen later, in most cases the narrow modules act as a filler between angularly related wide modules, so that some upright edges of narrow modules are joined edge to edge with some upright edges of wide modules. In many combinations of modules some upright edges of the different wide modules are joined edge to edge directly to one another.

In a special case the narrow modules may have triangular sides joined on a straight edge, so that the top or ridge is a straight line instead of a curve, this being particularly useful for a hexagonal array of modules having a peaked center spire, or having an openable roof, as described later.

In all cases the buildings require no support poles which would spoil the continuity of the floor area. In that respect the modules and the buildings are self-supporting.

The foregoing and additional features are described in the following detailed specification which is accompanied by drawings in which:

FIG. 1 is explanatory of the construction of a wide module;

FIG. 2 is explanatory of the construction of a narrow module;

FIG. 3 is a plan view of a combination of one narrow and two wide modules;

FIG. 4 is a front elevation thereof;

FIG. 5 is a plan view of a combination of three wide modules;

FIG. 6 is a front elevation thereof;

FIG. 7 is a plan view of a combination of one narrow and three wide modules;

FIG. 8 is a plan view of a combination of one narrow and four wide modules;

FIG. 9 is a plan view of a combination for four wide and two narrow modules;

FIG. 10 is a plan view of a combination of four wide and three narrow modules;

FIG. 11 is a plan view of a combination of six wide and three narrow modules;

FIG. 12 is a diagram explanatory of the base shape of a preferred form of wide module;

FIG. 13 is a diagram explanatory of the base shape of a preferred form of narrow module;

FIG. 14 is a plan view of a building using six wide modules and six narrow modules, which may provide either a center peak and/or an openable center roof area;

FIG. 15 is a front elevation of the same;

FIG. 16 is a plan view like FIG. 14, but showing the structure with the central roof area opened;

FIG. 17 is a plan view showing a combination of four wide and two narrow modules, and further showing how additional modules may be added to increase the length of such a building as much as desired;

FIG. 18 shows the building with increased length, combining seven wide and four narrow modules;

FIG. 19 is an elevation of the building shown in FIG. 18 looking in the direction of the arrows 19—19 in FIG. 18;

FIG. 20 is explanatory of a modified narrow module; and

FIG. 21 explains a modification detail of the side walls of a wide module.

Referring to the drawing, FIG. 1, reading from left to right, shows the side of a wide module in flat condition; the edge view in flat condition; the side of the same module in spread condition; the front of the spread module; and a plan view of the spread module. In FIG. 1 the two walls of a wide sector are shown at 22 and 24. They are sector shaped, the curved edges 26 curving on a radius R, and being hingedly joined. The material is semi rigid or flexible, and when the walls are spread apart, two radial edges are secured to the ground or base, as shown at 28, while the curved joined edge 26 is exposed generally upward and acts as a roof ridge. A strip of sealing material 30 is preferably applied along this edge, and the sealing strip may be made of extruded plastics material, and may act also as hinge material for joining the side walls. As explained in my companion application aforesaid, mechanical hinges may be used, supplemented by strip 30 then acting simply as a sealing or roofing strip.

When the side walls are spread apart the height is reduced, and the ridge peak 32 moves forward so that it overhangs a line drawn between the bottom corners 34. The sides flex convexely outward as shown at 36, particularly if the ridge is lowered to a desired height described later. The sides flex outwardly when viewed in plan, as well as when viewed in elevation as indicated at 38, and here again the sides may be given a preferred curvature described later.

A narrow module is shown in FIG. 2, and reading from left to right FIG. 2 shows the side of the module in flat condition, the edge view of the module in flat condition; a front view of thermodule in spread condition; and a plan view of the module in spread condition. Here again there are two like and generally sector-shaped side walls 42 and 44. The arcuate edge 46 is preferably curved on the same radius R as the wide module, and here again there are hinges and a sealing strip 50 joining the curved edges. The latter are disposed upward like a roof ridge, and the sector is disposed with its apex 48 downward. When the sides are spread apart they provide an opening 54 one edge of which conforms to or may be conformed to one edge of the opening 35 of the wide module shown in FIG. 1. When viewed in plan, the narrow module assumes a diamond-shaped outline made up of two triangles back to back as shown at 56 (FIG. 2) or in FIG. 13.

The modules are subject to variation in shape and design, but there is one particular design which is of great convenience and value because of the simplicity of the geometry involved. In this design the side walls 22 and 24 of the wide sector are a quadrant or 90° in width when flat, as shown at the left of FIG. 1. The narrow modules have side walls which are a sector of a circle having the same radius, but only half the width, that is, the radial edges are disposed at an angle of 45° as shown at the left of FIG. 2.

Referring now to FIG. 12, the forward bottom corners (34 in FIG. 1) of the side walls are spread apart a distance A–B (FIG. 12) which is equal to a radius R' which approaches and is nearly, but not quite the same as the radius R (FIGS. 1 and 2) which defines the side walls of the wide and narrow sectors when flat. The bottom edges of the side walls assume a natural curvature, but if not they are guided when secured to the ground or base on a curve having the radius R'. As will be seen in FIG. 12 the three dotted line sides AB, BC, and CA are equal to R' and to one another. The curved distance AC or CB equals the radius R, and the distance R' is less than the radius R by only the small difference in length between the curve AC and the straight line AC.

As previously explained, the ridge peak moves forward to provide an overhang indicated at ADB. In FIG. 12 the angle $ABD$ = the angle $BAD$, and is made 30°, so that the angle ADB is 120°. The distance or overhang ED is then equal to $R'/2$ multiplied by the tangent of 30°, and the latter is 0.577.

The spread and curvature of the narrow module to match that of the wide module is made such that it covers a diamond-shaped floor area, illustrated in FIG. 13. In FIG. 13 the side $AD = DB = BF = FA = FD$, so that the triangles which are back to back on the line FD are equilateral triangles, the enclosed angles at A and B being 60° and the enclosed angles F and D being 120°. The sides AD and DB in FIG. 13 conform to the sides AD and DB in FIG. 12.

Modules having the described configuration may be assembled in a variety of ways. Referring to FIGS. 3 and 4 two wide modules 60 and 62 are secured together along their mating edges 64. The resulting enclosure may be increased in area and at the same time given a desirable roof overhang, by the addition of a narrow module 66 having one edge secured to module 60 on line 68, and another edge secured to module 62 on line 70. Sealing strips for the wide modules are indicated at 30, and a sealing strip for the narrow module is indicated at 50.

It will be understood that additional sealing strips are applied along the adjoining edges or seams 64, 68 and 70, but these have been intentionally omitted in FIG. 3 and in all succeeding figures, in order to more readily distinguish the raised ridge line from a non-ridge or valley line. In FIG. 4 the resulting open entrance way is indicated at 72, but it will be understood that for a fully enclosed building this opening 72 may be closed by a generally upright wall, most simply located as indicated by the broken line 74 in FIG. 3. The wall 74 may have appropriate openings with closures such as a door and/or windows.

A building made up of three wide sectors, with no narrow sectors, is illustrated in FIGS. 5 and 6. The wide sectors 76, 78 and 80 are joined at their upright edges, as is indicated at 82, 84 and 86. Here again, sealing material for the ridges is indicate at 88, and similar sealing strips, intentionally not shown, are applied to the valleys or joined edges 82, 84 and 86. The buiding may be fully enclosed as shown in broken lines, and appropriate openings for doors and/or windows may be made directly in the side walls.

In some cases a very open structure may be wanted, for summer use, or for use in tropical climates, and in such case some or all of the side walls may be largely cut away as indicated in solid lines in FIGS. 5 and 6. This leaves a roof-like structure combining three arches which meet at the center, the side openings being indicated at 90 in FIG. 6.

Additional structures may be described with reference solely to plan views. The making of such designs is facilitated by using small cut-outs having the configurations shown in FIGS. 12 and 13, because these represent floor areas beneath the modules, and the floor pieces may be moved about and assembled in a great variety of combinations.

Thus, in FIG. 7 the structure combines three wide modules 92, 94 and 96, with one narrow module 98. The latter is joined to module 92 on the line 100, and to module 94 on line 101, and to module 96 on the line 102, while the modules 94 and 96 are joined directly to one another on the line 103. There is an open entrance way at 106, and if desired, this may be roofed over by means of another narrow module, not shown, but which obviously may be joined to the edge 103 of wide module 92, and to the edge 104 of narrow module 98. To close the structure an upright wall may be provided beneath this added module, and extending between the bottom corners of the edges 102 and 104. Sealing strips are used on the ridges, as shown, and are not shown but are used also on the valley lines.

FIG. 8 shows a building which combines four wide modules 110, 112, 114 and 116 with one narrow module 118. The wide modules are joined directly on the lines 120 and 122, while the narrow module is joined to the wide modules on the four lines 124, 126, 128 and 130. Here again, sealing strips are shown on the ridges, and will also be used (although not shown) in the valleys, that is to seal the edges 120, 126, 128, 122, 130 and 124. In this case openings for doors and windows may be provided directly in the walls of the modules.

FIG. 9 shows a combination of four wide modules 132, 134, 136 and 138, with two narrow modules 140 and 142. Two wide modules are joined directly on the line 144. The two narrow modules are joined directly to one another on the line 146. The narrow modules are joined to the wide modules on lines 148, 150, 151, 152 and 154. The building is open at 156 and 158, and if desired this opening may be roofed over by the addition of another narrow module. For full closure, this added module may receive an upright wall, all as previously described in FIG. 3, showing narrow module 66 and upright wall 74. Here again, and in the succeeding figures, ridge strips are shown, and valley strips are not shown but are used.

A somewhat different arrangement using four wide modules and three narrow modules is shown in FIG. 10, in which the wide modules 160 and 162 are directly joined at 164, and wide modules 166 and 168 are directly joined at 170. A narrow module 172 is joined to wide module 160 on line 174, and to wide module 162 on line 176. A narrow module 178 is joined to the wide module 166 on line 180, and is joined to wide module 168 on line 182. A third narrow module 184 provides a roof overhang for the resulting open side of the building, and here again if the building is to be fully closed, an upright wall may be provided and is indicated by the dotted line 186.

A building comprising six wide and three narrow modules is shown in FIG. 11, in which wide modules 190 and 192 are joined at 194, wide modules 196 and 198 are joined at 200; and wide modules 202 and 204 are joined at 206. A narrow module 208 is joined to wide module 190 on line 210, and to wide module 192 on line 212. A narrow module 214 is joined to wide module 196 on line 216, and to wide module 198 on line 218. A third narrow module 220 is joined to wide module 204 on line 222, and is joined to wide module 202 on line 224. The narrow modules are joined to one another on lines 226, 228, and 230. The common vertex or center point of the building is a high point, as is desirable so that the entire structure houses a continuously open space, without need for or interference by supporting columns. In FIG. 11, as in all of the figures, sealing strips have been indicated for the ridges, and are used, but have been omitted in the valleys to help make the drawing clear when showing only a plan view.

A special form of building is illustrated in FIGS. 14 and 15. This employs six wide modules arranged symmetrically around six narrow modules which are disposed at the center, but in this case the narrow modules are slightly modified. The wide modules may be standard. Referring first to FIG. 20, the narrow module has side walls 232 which differ from that shown at 42 in FIG. 2, only in that the top edge 234 is straight instead of curved. The generally upright edges have a length equal to the radius R in FIGS. 1 and 2. The floor pattern covered by the modified module of FIG. 20 is the same as that previously described in connection with FIG. 13. Referring now to FIG. 14, the wide modules are shown at 241, 242, 243, 244, 245 and 246, and none are joined directly to one another. The outer ends of the narrow modules radiate outward around a hexagon, like a six pointed star. The parts 251, 252, 253, 254, 255, and 256 are connected to and join the wide modules. The inner triangular parts of the narrow modules 261, 262, 263, 264, 265 and 266 could be turned downward but that would block and spoil the central part of the interior of the building, and instead they are turned upward to form a peak or short spire, as is shown in FIG. 15 at the walls 263, 264, and 265. The other three walls are disposed on the opposite side and complete the hexagonal peak or pyramid. It will be evident that this change in direction as between the outer and inner halves of the narrow modules is greatly facilitated and simplified by using straight connecting lines, as shown at 234 in FIG. 20, instead of the arcuate lines normally used for the narrow module. For a permanent peaked roof the meeting edges are sealed by appropriate sealing or roofing strips, and if desired the entire pyramid may be covered with roofing material. This is also true of the other structures illustrated in this specification, that is, all exterior walls may be clad or protected.

A building with an openable roof may be provided while using the hexagonally arranged modules described in connection with FIGS. 14 and 15. This may be described with reference to FIGS. 15 and 16, the important change being that the inner triangles 261 through 266 (FIG. 14) are hinged for outward movement, instead of being permanently connected in the form of a pyramid. Thus, in FIG. 15, the part 263 may be swung outward as shown in broken lines at 263', and the part 265 may be swung outward as shown in broken lines at 265'. If fully opened, these inner parts are turned out of the way and leave a hexagon shaped open top as shown at 270 in FIG. 16.

The modules may be arranged in a chain fashion such that the structure may be lengthened by the addition of further modules. Referring to FIG. 17, the modules are being set up in a formation which may be extended as shown in FIG. 18, such extension being without limit. In FIG. 17 the wide modules 272, 274 and 278 are joined by two narrow modules 280 and 282. The narrow modules are themselves connected on line 284. Narrow module 280 is connected to wide module 272 on line 286, and to wide module 274 on line 288. The narrow module 282 is connected to wide module 274 on line 290, and is connected to wide module 278 on line 292. The double line of modules is shown terminated by a wide module 294, this being shown in solid lines. However, if the chain of modules is not to be terminated, the module 294 is not used, and instead a narrow module shown in broken lines is added at 296, and this accommodates the addition of another wide module shown in broken lines at 298. The chain of modules now may be closed by a wide module shown in broken lines at 300, but it need not be closed, and instead the chain may be continued.

This will also be seen by comparison of FIG. 18 with FIG. 17. In FIG. 18 there are wide modules 301, 302, 303, 304, 305, 306 and 307. The end modules 301 and 307 may be considered to be closure modules which close the structure. Alternatively each end could have a narrow module and an upright wall, as was described in connection with FIGS. 3 and 10. The narrow sectors which connect the wide sectors are shown at 311, 312, 313, and 314. It will be evident that by detaching and changing the angular position of either end module, one may add additional narrow modules for connection of additional wide modules, to expand or lengthen the chain of modules.

FIG. 19 shows how the structure of FIG. 18 looks when viewed in the direction of the arrows 19—19 in FIG. 18. The building closes with end modules 301 and 307. The intermediate wide modules are shown at 302, 304 and 306, while the narrow modules therebetween are shown at 311, 312, 313, and 314.

In the foregoing description it should be understood that many terms are used for convenience, but must be considered to be approximate rather than exact. For example, the quadrant or 90° wall shown in FIG. 1 has straight radial edges. This is not intended to exclude a slight curvature of the radial lines, and referring to FIG. 21, a slight concavity as suggested at 320 may provide a more accurate fit when joining a wide module to an adjacent wide module, as in FIG. 3 and other illustrated layouts. If the module is being mounted on a perfectly plane base, typically a cement foundation slab, a slight convexity of the bottom edge as shown at 322 in FIG. 21 improves the fit of the side walls against the base or slab.

The modules may be supplied with prefabricated flooring sections, and the said sections may be given the configuration shown in FIGS. 12 and 13. In such case the floor section of the wide module may be used to actually shape the configuration of the side walls at their bottom edge, and the floor sections for the narrow modules may be used to properly orient and locate the successive modules as they are being assembled on the foundation slab.

Although in FIGS. 3 and 10 I have shown an upright closure wall which is one vertical plane, corresponding to the broken line AB in FIGS. 12 and 13, the closure may be made up of two smaller walls, disposed in intersecting planes on the lines AD and DB shown in FIGS. 12 and 13.

The narrow modules with acute angle downward, particularly in the form shown in FIG. 20, may be alternated with narrow modules disposed with the acute angle upward, thus providing a continuous tunnel or connection of desired length leading to or between modules, while still using the basic modular construction and modules.

The side walls may be made of plywood, with a thickness dependent on the size. In small size the thickness may be about ¼ inch, and in larger size, say up to sixteen feet radius, the thickness may be about ⅜ inch. Other materials which may be used are Masonite in a grade designed for exterior use, aluminum sheeting, aluminum ceramic sheeting, steel sheeting, fiberglass impregnated with epoxy, fiberglass impregnated with polyester resin, acrylic sheeting, a sheet material known as ABS, corrugated cardboard surfaced with polyethylene, and others.

For integral hinging by means of a strip made of a plastic material the plastic used may be polypropylene as an example. Conventional metal hinging may be used, supplemented by an extruded strip, and in both cases the extrusion may be H shaped in cross section to receive the upper edge of each of the side walls.

The structure may be finished with a surface treatment using marine deck paint, siding paint, acrylic paint, or by using fiberglass and epoxy.

In small size the structure may be used as a beach cabana, dog house, tool shed, ticket booth etc. In larger size it may be used as a warehouse, a sleeping shelter, a vacation house, a military shelter, a military hospital, a residence, a store, a roadside stand, a band shell, a night club, an exhibit hall, a museum, a church, a school a motel, a hotel and for other purposes.

It is believed that the construction and design and method of assembly of my multiple modules to form a variety of structures, as well as the advantages thereof, will be apparent from the foregoing detailed description. It will also be apparent that while I have shown and described the structures in a number of preferred forms, changes may be made without departing from the scope of the invention. In the claims the geometric terms "sector," "equal," "equilateral" and "radical" etc. are meant in an approximate rather than exact sense. The term "upright edge" merely distinguishes from other edges that rest on the cement slab, or that act as a roof ridge.

I claim:

1. A modular shelter comprising three or more modules, each module having two like semi-rigid flexible sector-shaped side walls hingedly joined along their curved edges, said curved joined edges being exposed generally upward and acting as a roof ridge, said walls being separable and spread apart at their radial edges, at least some of the modules being positioned with one pair of radial edges secured to ground or base, and with the other pair of radial edges generally upright, and at least some of the modules being joined edge to edge at their adjacent edges to form a continuous shelter, in which the side walls of some modules are approximately a quadrant of 90° sector.

2. A modular shelter comprising three or more modules, each module having two like semi-rigid flexible sector-shaped side walls hingedly joined along their curved edges, said curved joined edges being exposed generally upward and acting as a roof ridge, said walls being separable and spread apart at their radial edges, at least some of the modules being positioned with one pair of radial edges secured to ground or base, and with the other pair of radial edges generally upright, and at least some of the modules being joined edge to edge at their adjacent edges to form a continuous shelter, in which some of said modules are relatively wide and one or more of said modules are relatively narrow and have an acute angle and which are disposed with their acute angle downward, with the radial edges generally upright, at least some upright edges of adjacent wide and narrow modules being joined edge to edge.

3. A modular shelter as defined in claim 2, in which the side walls of the narrow modules are sectors having an angle approximately half that of the side walls of the wide modules.

4. A modular shelter as defined in claim 2, in which the side walls of the narrow modules are sectors having an angle of approximately 45°.

5. A modular shelter as defined in claim 2, in which the side walls of the wide modules are sectors having an angle of about 90°, and the side walls of the narrow modules are sectors having an angle of about 45°.

6. A modular shelter as defined in claim 5, in which the side walls of the wide modules are spread apart at the bottom corners of the open end a distance R' nearly equalling the radius R of the sector wall, and in which the ridge peak of the wide sector is so positioned that it overhangs an imaginary line connecting the said bottom corners an amount equal to half the aforesaid distance R' times the tangent of 30°.

7. A modular shelter as defined in claim 6, in which the wide module is so shaped that it covers a base area defined by two curves having a radius equalling the spread R', and by two slipping lines intersecting at a point projecting an amount determined by the tangent of 30° times half of the aforesaid spread R'.

8. A modular shelter as defined in claim 7, in which the narrow module covers a diamond-shaped base area the log axis of which is equal to the spread R' of the sector walls, and the short axis of which is equal to the tangent of 30° times the said spread R'.

9. A modular shelter as defined in claim 8, in which the diamond shaped base has four equal sides which also equal the short axis, making up two equilateral triangles back to back, the interior angles of the diamond being 60° and 120°.

10. A modular shelter as defined in claim 2, in which the wide module is so shaped that it covers a base area defined by two curves having a radius R' nearly as great as the radius of the wall R, and by two sloping lines intersecting at a point projecting an amount determined by the tangent of 30° times half of the aforesaid radius R'.

11. A modular shelter as defined in claim 10, in which the narrow module covers a diamond-shaped base area the long axis of which is equal to the spread R' of the sector walls, and the short axis of which is equal to the tangent of 30° times the said spread R'.

12. A modular shelter as defined in claim 2, in which the narrow module covers a diamond-shaped base area the long axis of which is nearly equal to the radius of the sector wall, and the short axis of which is equal to the tangent of 30° times the said long axis.

13. A modular shelter as defined in claim 2, in which at least some upright edges of wide modules are joined edge to edge and in which some upright edges of narrow modules are joined edge to edge with some upright edges of wide modules.

14. A modular shelter comprising wide modules, and narrow modules, each wide module comprising two like semi-rigid flexible sector shaped side walls hingedly joined along their curved edges, said curved joined edges being exposed generally upward and acting as a roof ridge, said walls being separable and spread apart at their radial edges, the wide modules being positioned with one pair of radial edges secured to ground or base, and with the other pair of radial edges being generally upright, the narrow modules having generally triangular side joined along one edge and disposed with the joined edge elevated and the apex downward, at least some upright edges of modules being joined edge to edge, to form a continuous shelter.

15. A modular shelter as defined in claim 14, in which the side walls of the wide modules are approximately a quadrant or 90° sector.

16. A modular shelter as defined in claim 15, in which the walls of the narrow modules have an angular width of approximately 45°.

17. A modular shelter as defined in claim 16, in which the narrow module covers a diamond-shaped base area having four equal sides and the long axis of which is equal to nearly the radius of the sector wall, and the short axis of which is equal to one of the sides.

18. A modular shelter as defined in claim 14, in which the side walls of the wide modules are spread apart at the bottom corners of the open end a disance R' nearly equalling the radius R of the sector walls, and in which the ridge peak of the wide sector is so positioned that it overhangs a line connecting the bottom corners an amount equal to half the aforesaid spread R' times the tangent of 30°.

19. A modular shelter comprising six wide modules as defined in claim 18, disposed corner to corner to form a six pointed array, and in which the resulting spaces between adjacent modules are joined edge to edge with the outer halves of six narrow modules, the inner halves of said narrow modules being turned upward and joined edge to edge to form a central six-sided peak.

20. A modular shelter as defined in claim 19, in which the inner halves of the narrow modules are so hinged that they can be turned outward to provide a hexagon shaped open roof at the middle of the shelter.

References Cited
UNITED STATES PATENTS 2,982,290   5/1961   Hunziker _____ 52—81

JOHN E. MURTAGH, Primary Examiner

U.S. Cl. X.R.

52—82